United States Patent
Line et al.

(10) Patent No.: US 9,914,421 B2
(45) Date of Patent: Mar. 13, 2018

(54) SEATBACK FLEXIBLE SLIP PLANE JOINT FOR SIDE AIR BAG DEPLOYMENT

(71) Applicant: Ford Global Technologies, LLC, Dearborn, MI (US)

(72) Inventors: Johnathan Andrew Line, Northville, MI (US); Marcos Silva Kondrad, Macomb, MI (US); Richard Joseph Soyka, Jr., Shelby Township, MI (US); Lisa Marie Carr, Dearborn, MI (US); Nicholas Alphonse Billardello, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 14/996,697

(22) Filed: Jan. 15, 2016

(65) Prior Publication Data
US 2017/0203709 A1    Jul. 20, 2017

(51) Int. Cl.
*B60R 21/207* (2006.01)
*B60R 21/2155* (2011.01)
(Continued)

(52) U.S. Cl.
CPC .......... *B60R 21/207* (2013.01); *B60R 21/215* (2013.01); *B60R 21/2155* (2013.01); *B60R 21/231* (2013.01)

(58) Field of Classification Search
CPC .. B60R 21/207; B60R 21/2155; B60R 21/231
See application file for complete search history.

(56) References Cited

U.S. PATENT DOCUMENTS

| 2,958,369 A | 11/1960 | Pitts et al. |
| 3,403,938 A | 10/1968 | Cramer et al. |

(Continued)

FOREIGN PATENT DOCUMENTS

| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Darlene P Condra
(74) *Attorney, Agent, or Firm* — Vichit Chea; Price Heneveld LLP

(57) ABSTRACT

A vehicle seatback assembly includes a cushion assembly having a seating surface. A back panel includes a first side portion, a second side portion, and a back portion. A first living hinge is disposed between the first side portion and back portion. A second living hinge is disposed between the second side portion and back portion. A frame is disposed between the back panel and the cushion assembly. A peripheral cushion structure supports a periphery of the cushion assembly. A closeout panel is coupled with the back panel and is disposed behind the cushion structure to define a peripheral gap between the closeout panel and the cushion structure that extends around the sides of said seatback assembly. A shingled portion of the closeout panel extends behind and couples with the back panel. An airbag is coupled with the frame and is configured to deploy between the closeout and back panels.

16 Claims, 13 Drawing Sheets

(51) Int. Cl.
*B60R 21/231* (2011.01)
*B60R 21/215* (2011.01)

(56) References Cited

U.S. PATENT DOCUMENTS

| | | | |
|---|---|---|---|
| 3,929,374 A | 12/1975 | Hogan et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A | 9/1985 | Goldner | |
| 4,629,248 A | 12/1986 | Mawbey | |
| 4,720,141 A | 1/1988 | Sakamoto et al. | |
| 4,884,843 A | 12/1989 | DeRees | |
| 4,915,447 A | 4/1990 | Shovar | |
| 5,171,062 A | 12/1992 | Courtois | |
| 5,174,526 A | 12/1992 | Kanigowski | |
| 5,490,718 A * | 2/1996 | Akizuki | B60N 2/507 297/452.18 |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,352,310 B1 | 3/2002 | Schmidt et al. | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,786,544 B1 * | 9/2004 | Muraishi | B60N 2/36 297/216.14 |
| 6,802,563 B1 | 10/2004 | Mysliwiec et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,309,105 B2 | 12/2007 | Mundell et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,578,554 B2 | 8/2009 | Lee et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,056,923 B2 | 11/2011 | Shimono | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,177,256 B2 | 5/2012 | Smith et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,328,227 B2 | 12/2012 | Shimono | |
| 8,342,607 B2 | 1/2013 | Hofmann et al. | |
| 8,371,655 B2 | 2/2013 | Nonomiya | |
| 8,474,917 B2 * | 7/2013 | Line | B60N 2/5825 297/188.04 |
| 8,905,431 B1 * | 12/2014 | Line | B60R 21/207 280/728.2 |
| 9,302,643 B2 * | 4/2016 | Line | B60N 2/58 |
| 9,409,504 B2 * | 8/2016 | Line | B60N 2/64 |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |

(56) References Cited

U.S. PATENT DOCUMENTS

| | | |
|---|---|---|
| 2009/0066122 A1 | 3/2009 | Minuth et al. |
| 2009/0165263 A1 | 7/2009 | Smith |
| 2009/0218869 A1* | 9/2009 | Larsen ................ B60N 2/3018 297/350 |
| 2009/0322124 A1 | 12/2009 | Barkow et al. |
| 2010/0038937 A1 | 3/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |

FOREIGN PATENT DOCUMENTS

| | | |
|---|---|---|
| EP | 1266794 | 3/2004 |
| EP | 1462318 A1 | 9/2004 |
| EP | 1123834 | 10/2004 |
| EP | 1050429 | 10/2005 |
| EP | 1084901 | 6/2006 |
| EP | 1674333 A1 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

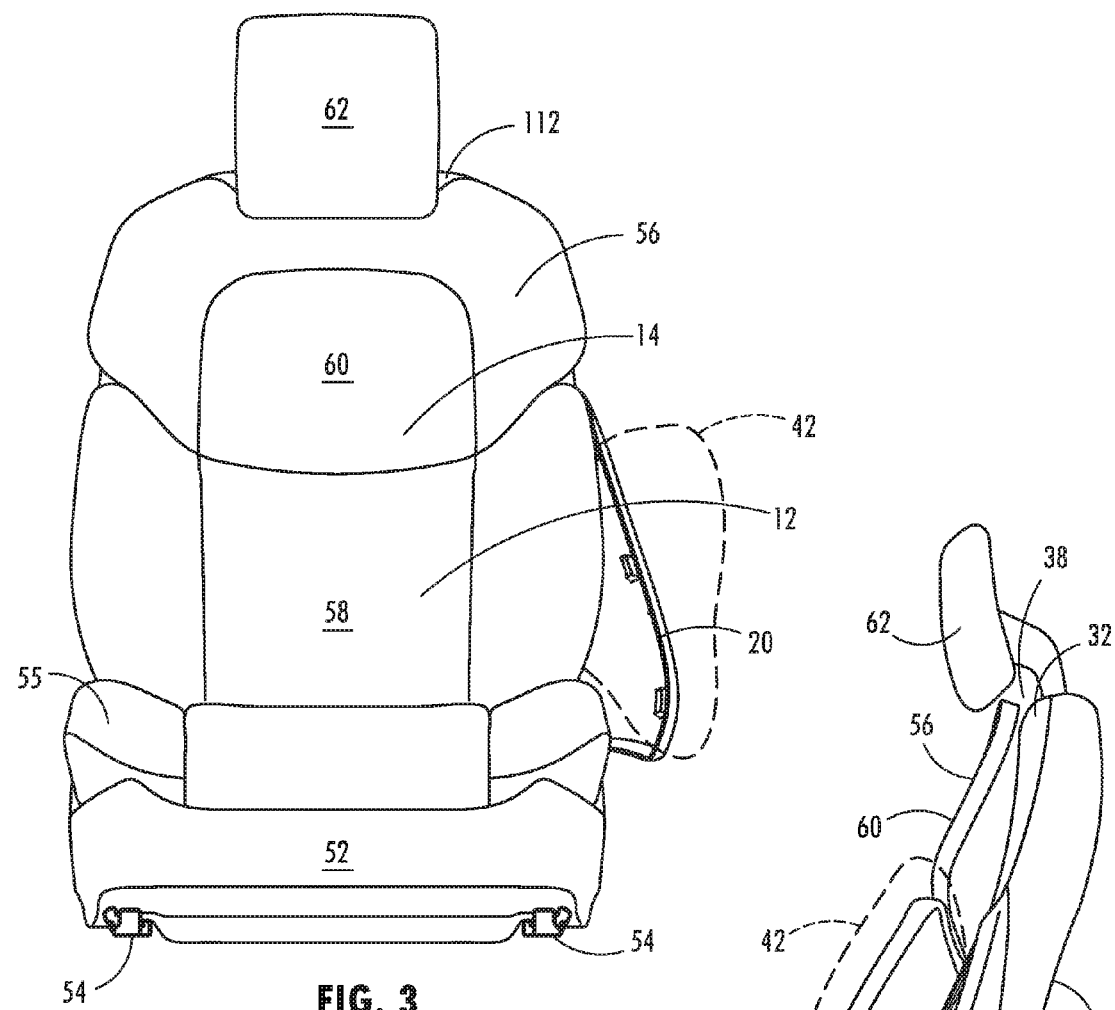
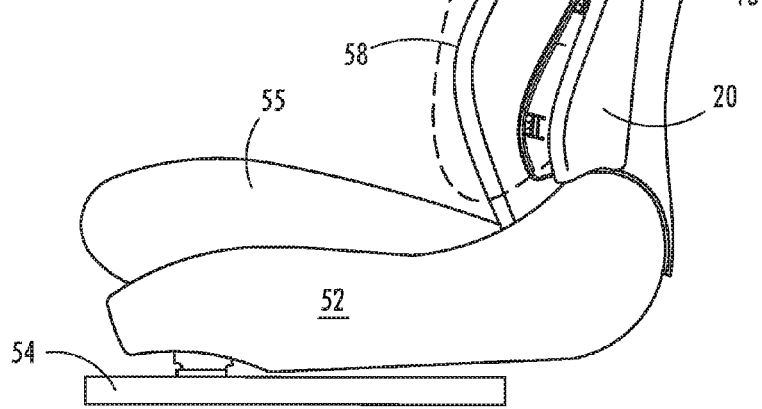

SEATBACK FLEXIBLE SLIP PLANE JOINT FOR SIDE AIR BAG DEPLOYMENT

FIELD OF THE DISCLOSURE

The present disclosure generally relates to a vehicle seatback assembly, and more particularly to a seatback flexible slip plane joint for side air bag deployment for a vehicle seatback assembly.

BACKGROUND OF THE DISCLOSURE

It is becoming increasingly more common for vehicles to include airbag assemblies in locations that allow the contained airbag to deploy to desired areas of protection quickly and with a high degree of precision. It is generally understood that one location airbag assemblies are more frequently incorporated is within a seatback for deploying between a passenger and an adjacent vehicle door. Typically, these side airbags are encased within the fabric upholstery material of the seatback, such that upon deployment of the airbag the upholstery material is torn. This form of deployment may result in inconsistent airbag deployment and substantial damage to the seatback. As vehicle seats are equipped with airbag assemblies, it is also becoming desirable to decrease the overall volume of vehicle seats for reducing weight and providing adequate space for the passengers within the vehicle.

Vehicle seat assemblies are currently provided having integrated safety features for the protection of the vehicle occupant. Vehicle seat assemblies must be constructed in such a way that the vehicle seat is structurally sound and provides the support necessary for a vehicle occupant. In order to improve the safety features of a vehicle seat, an airbag deployment device may be incorporated into the vehicle seat design. When an airbag deployment device is integrated into the vehicle seat design, the assembly of the vehicle seat must accommodate proper deployment of the airbag deployment device. Thus, it is desirable to provide a seat assembly that can be assembled in an efficient manner while providing coupling features that are configured to allow for proper deployment of an airbag deployment device.

SUMMARY OF THE DISCLOSURE

According to one aspect of the present disclosure, a vehicle seatback assembly includes a cushion assembly having a seating surface. A back panel includes a first side portion, a second side portion, and a back portion. A first living hinge is disposed between the first side portion and the back portion and a second living hinge is disposed between the second side portion and the back portion. A frame is disposed between the back panel and the cushion assembly. A peripheral cushion structure supports a periphery of the cushion assembly. A closeout panel is coupled with the back panel and is disposed behind the peripheral cushion structure to define a peripheral gap between the closeout panel and the peripheral cushion structure that extends around the sides of said seatback assembly. A shingled portion of the closeout panel extends behind and couples with the back panel. An airbag is coupled with the frame and is configured to deploy between the closeout panel and the back panel.

According to another aspect of the present disclosure, a vehicle seatback assembly includes a seatback frame disposed between a back panel and a cushion assembly. A peripheral cushion structure supports a periphery of the cushion assembly. A closeout panel is coupled with the back panel and is disposed behind the peripheral cushion structure to define a peripheral gap. A shingled portion of the closeout panel is concealed behind and coupled with the back panel. An airbag is deployed between the closeout panel and the back panel.

According to yet another aspect of the present disclosure, a vehicle seatback assembly includes a seatback frame disposed between a back panel and a cushion assembly. A peripheral cushion structure supports a periphery of the cushion assembly. A closeout panel is coupled with the back panel and is disposed behind the peripheral cushion structure to define a peripheral gap. A shingled portion of the closeout panel is concealed behind and coupled with the back panel. An airbag is deployed between the closeout panel and the back panel.

According to still another aspect of the present disclosure, a vehicle seatback assembly includes a peripheral cushion structure and a back panel. A closeout panel is coupled with the back panel and is disposed behind the peripheral cushion structure to define a peripheral gap. A portion of the closeout panel is shingled behind the back panel. The construction set forth above provides a robust seating structure that is easy to manufacture and includes an improved interface between a side airbag and a deployment channel through which the airbag extends.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3 is a front elevational view of the vehicle seatback assembly of FIG. 2;

FIG. 4 is a side elevational view of the vehicle seatback assembly of FIG. 2;

DETAILED DESCRIPTION OF THE EMBODIMENTS

Figures 1, 2:
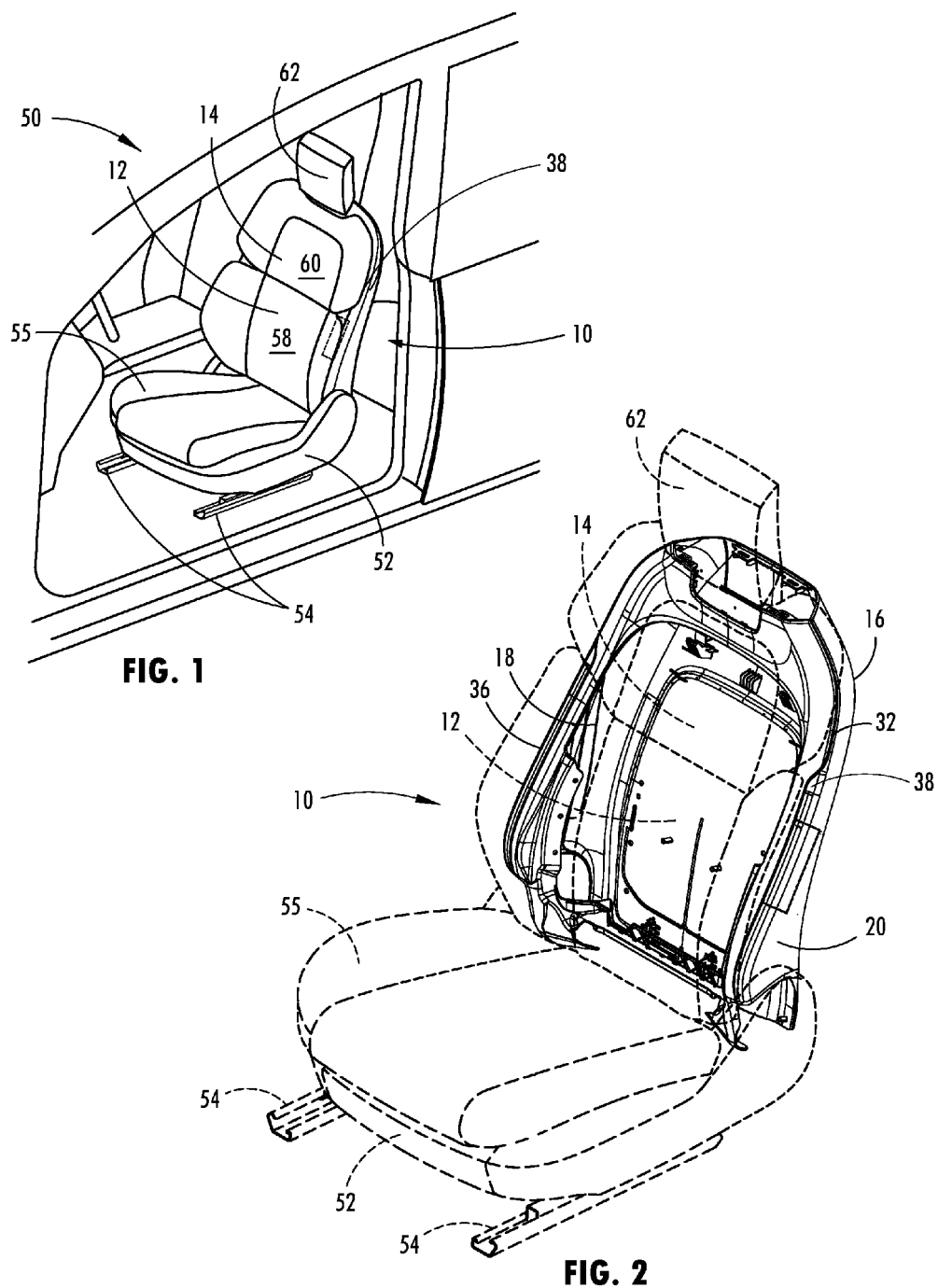
FIG. 1 is a top perspective view of one embodiment of a vehicle seatback assembly of the present disclosure disposed in a vehicle.
FIG. 2 is an enlarged top perspective view of the vehicle seatback assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-11A, reference numeral 10 generally designates a vehicle seatback assembly having a cushion assembly 12 that includes a seating surface 14. A back panel 16 includes a first side portion 18, a second side portion 20, and a back portion 22. A first living hinge 24 is disposed between the first side portion 18 and the back portion 22, and a second living hinge 26 is disposed between the second side portion 20 and the back portion 22. A frame 28 is disposed between the back panel 16 and the cushion assembly 12. A peripheral cushion structure 30 supports a periphery 32 of the cushion assembly 12. A closeout panel 36 is coupled with the back panel 16 and is disposed behind the peripheral cushion structure 30 to define a peripheral gap 38 between the closeout panel 36 and the peripheral cushion structure 30. The peripheral cushion structure 30 extends around sides of said vehicle seatback assembly 10. A shingled portion 40 of the closeout panel 36 extends behind and couples with the back panel 16. An airbag 42 is coupled with the frame 28 and is configured to deploy between the closeout panel 36 and the back panel 16.

With reference again to FIGS. 1 and 2, the present disclosure is generally directed to a vehicle seatback assembly 10 for use in a vehicle 50, such as a car, a truck, a van, etc. It is also contemplated that the concept set forth in this disclosure may be utilized in a front or forward seat of the vehicle 50 as well as rearward seats of the vehicle 50. The vehicle seatback assembly 10, as illustrated, includes a seat base 52 that is positioned on rail slides 54 to allow fore and aft movement of the vehicle seatback assembly 10 relative to the vehicle 50. A vehicle seat 55 is positioned on the seat base 52 and is movable relative thereto, as set forth in further detail below. In addition, the vehicle seatback assembly 10 includes a seatback 56 having a lower lumbar region 58 and an upper thoracic region 60 as well as a head restraint 62. Each of the components of the seatback 56 may be configured for adjustability to properly support the weight of various occupants inside the vehicle 50.

With reference now to FIGS. 3 and 4, the vehicle seatback assembly 10 is configured such that deployment of the airbag 42 results in expansion of the airbag 42, which moves between the closeout panel 36 and the second side portion 20 of the back panel 16. The second side portion 20 of the back panel 16 rotates about the second living hinge 26, thereby providing space for the airbag 42 to deploy. It is generally contemplated that the airbag 42 may be positioned at both the first side portion 18 and the second side portion 20. In this instance, the airbag 42 is deployed both in an inboard side and an outboard side of the vehicle seatback assembly 10. Although the airbag 42, as illustrated is deployed about a lower region of the seatback 56, it will also be understood that the airbag 42 may deploy along an entire side of the seatback 56, or any portion of a side of the seatback 56.

Figure 5:
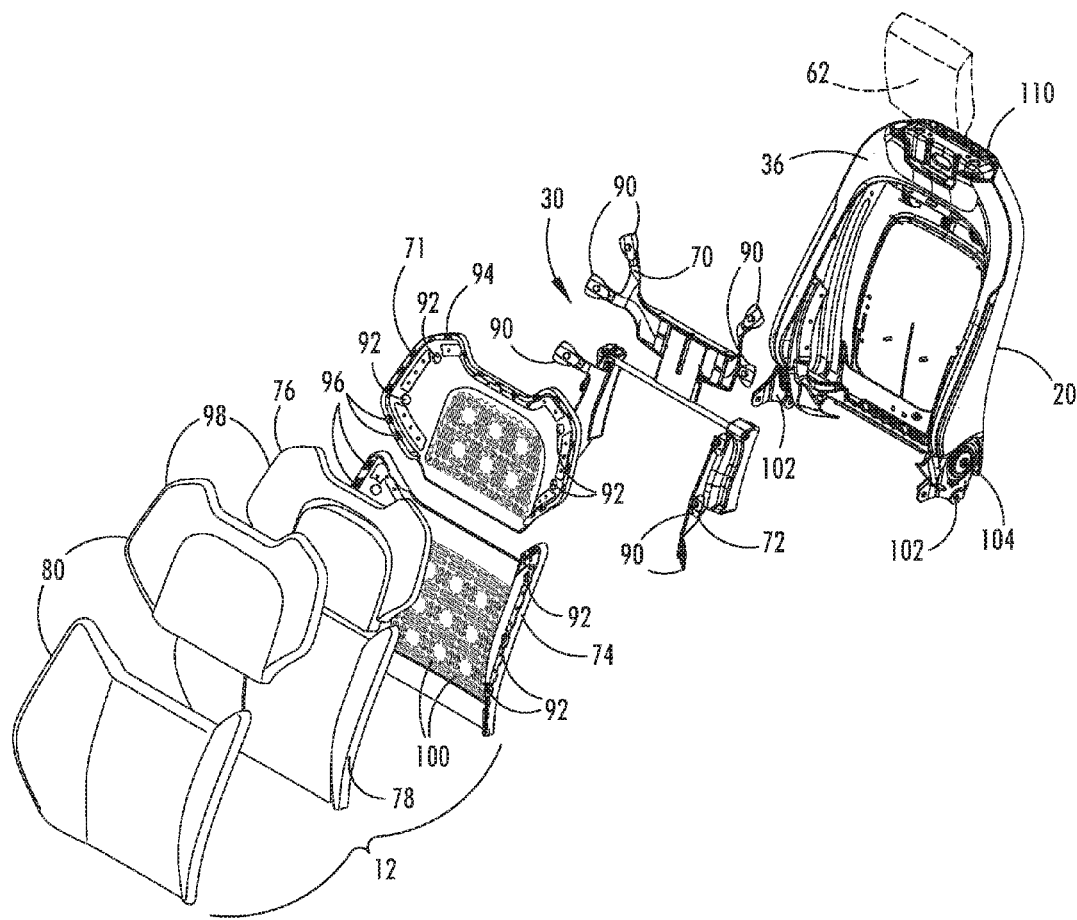
FIG. 5 is a top perspective exploded view of one embodiment of the vehicle seatback assembly of the present disclosure.

With reference to FIG. 5, the frame 28 of the seatback 56 is generally wrapped on a rear side by the back panel 16, and a front side by the closeout panel 36. The shingled portion 40 of the closeout panel 36 extends behind and couples with the back panel 16 to provide an aesthetically pleasing coupling of the seatback 56. An upper thoracic adjustment feature 70 is configured to adjust an upper portion of the seatback 56 and allow for movement of the upper seatback relative to the lower seatback. The upper thoracic adjustment feature 70 is coupled with an upper seatback carrier 71. A lower lumbar region 72 is operably coupled with a lower seatback carrier 74. The upper and lower seatback carriers 71, 74 provide support to upper and lower cushions 76, 78 and a coverstock 80 upon which an occupant rests.

With reference again to FIG. 5, the upper thoracic adjustment feature 70 includes a plurality of snap-fit engagement members 90 configured to engage fastening apertures 92 defined on a peripheral extent 94 of the upper seatback carrier 71. In the illustrated embodiment, the lower lumbar region 72 also includes the plurality of snap-fit engagement members 90 configured to engage fastening apertures 92 in the lower seatback carrier 74. In addition, the upper and lower seatback carriers 71, 74 include a number of peripheral retention slots 96 configured to engage and support a periphery 98 of the upper and lower cushions 76, 78. Notably, the lower seatback carrier 74 includes a plurality of slots 100 designed to allow air movement through the vehicle seatback assembly 10. This construction is useful when a climate control system, which may include an air moving device, such as a fan, is coupled with the vehicle seatback assembly 10. The entire vehicle seatback assembly 10 is operably coupled with the seat base 52 at support brackets 102, which include recliner hearts 104 configured to allow for rotation of the vehicle seatback assembly 10 relative to the seat base 52. In addition, an upper portion of both the back panel 16 and the front closeout panel 36 define an opening 110 to receive a head restraint trim piece 112 that in turn is configured to receive the head restraint 62.

Figure 6:
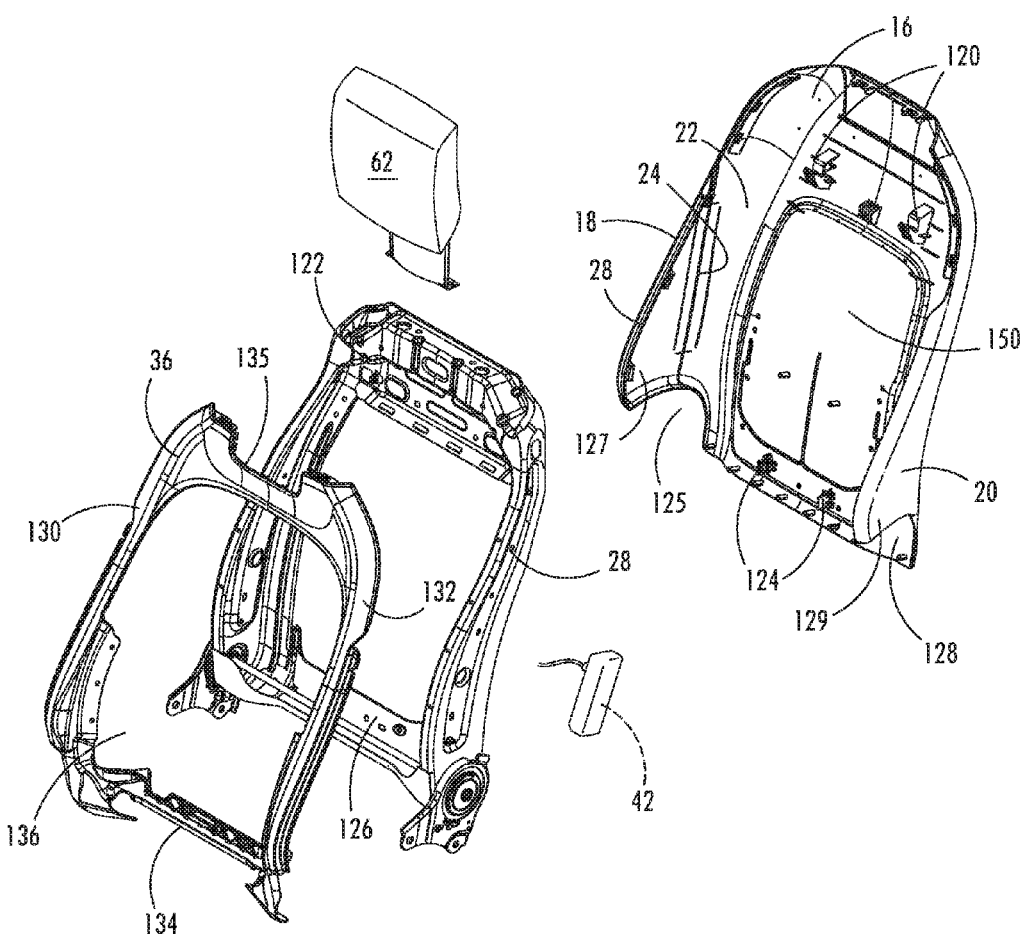
FIG. 6 is a front perspective partially exploded view of a closeout panel, frame, and back panel of the vehicle seatback assembly of the present disclosure.

Referring now to FIG. 6, the back panel 16 and the front closeout panel 36 are illustrated as exploded away from the seat frame 28. The back panel 16 includes upper hooks 120 configured to engage an upper cross member 122 of the seat frame 28. In addition, the back panel 16 also includes retention clips 124 on a lower portion thereof configured to engage an anchorage bracket disposed on a rear side of a lower cross member 126 of the seat frame 28. The closeout panel 36 is configured to engage either the seat frame 28, or the back panel 16, resulting in the closeout panel 36 being securely engaged over a front portion of the seat frame 28. Each side of the back panel 16 includes a triangular section configured to flex away from the closeout panel 36. More specifically, the first side portion 18, the first living hinge 24, and a first scalloped portion 125 define a triangular section 127. Similarly, the second side portion 20, the living hinge 26, and a second scalloped portion 128 define a second triangular portion 129.

Figure 7:
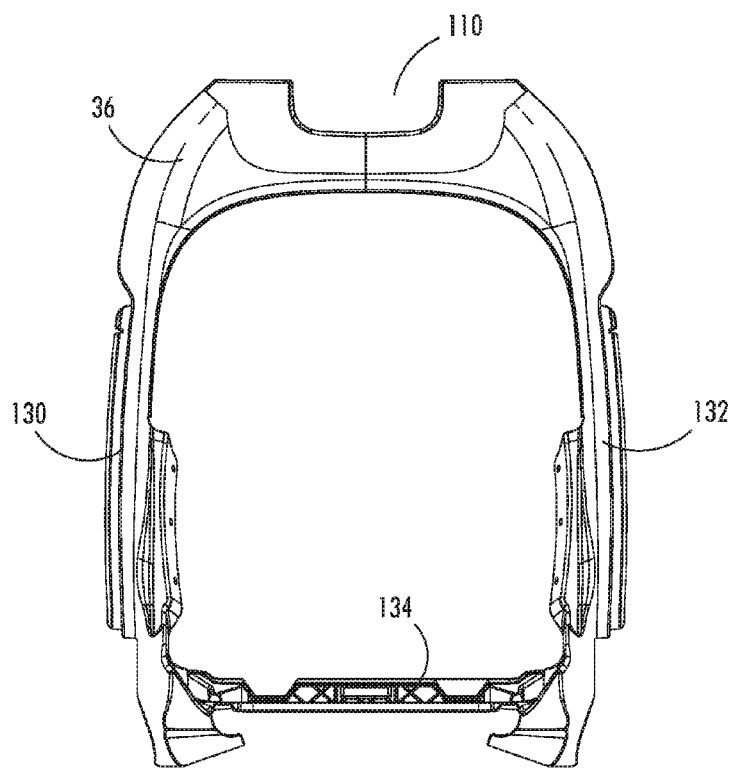
FIG. 7 is a front elevational view of the closeout panel of the seatback of FIG. 6.
Figure 7A:
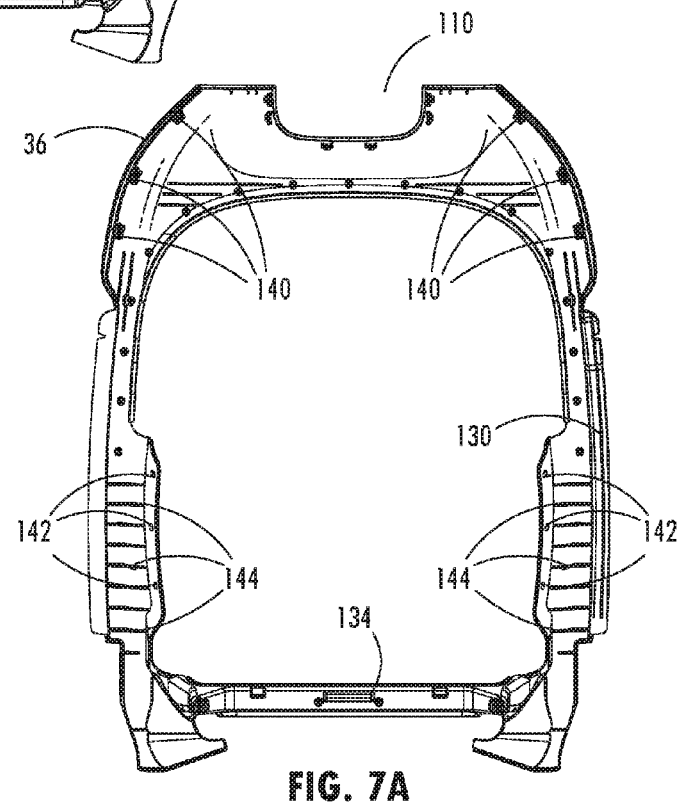
FIG. 7A is a rear elevational view of the closeout panel of the seatback of FIG. 7.

With reference to FIGS. 7 and 7A, the closeout panel 36 includes a variety of features. As previously noted, the front closeout panel 36 includes the upper opening 110 configured to receive the head restraint trim piece 112. In addition, the closeout panel 36 includes side members 130, 132 configured to engage the first and second side portions 18, 20 of the back panel 16. A bottom portion of the back panel 16 includes a lower cross member 134 configured to provide rigidity to the closeout panel 36. An upper cross member 135 of the closeout panel 36 includes a plurality of engagement features 140 configured to couple with engagement features 141 on the back panel 16. The side members 130, 132, as well as the lower cross member 134 and the upper cross member 135, together define an intermediate cavity 136. It is generally contemplated that the plurality of engagement features 140 may include snap-fit posts configured to engage slots in the back panel 16, or may include slots configured to receive snap-fit posts from the back panel 16. In addition, the side members 130, 132 include securing features 142 with a plurality of apertures configured to engage the seatback 56. The securing features 142 are supported by a plurality of inner laterally extending flanges 144 that provide structural rigidity to the back panel 16 proximate the shingled portion 40.

Figure 8:
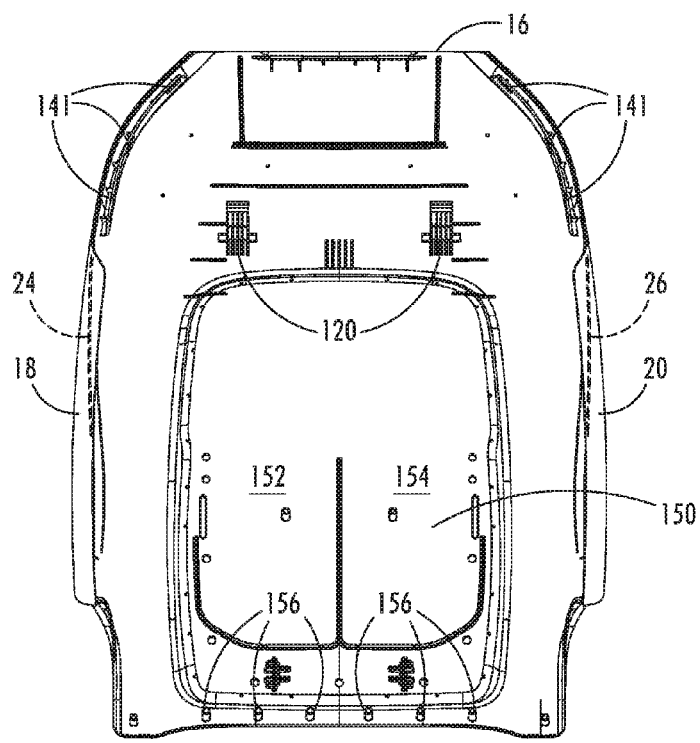
FIG. 8 is a front elevational view of a back panel of the vehicle seatback assembly of the present disclosure.
Figure 8A:
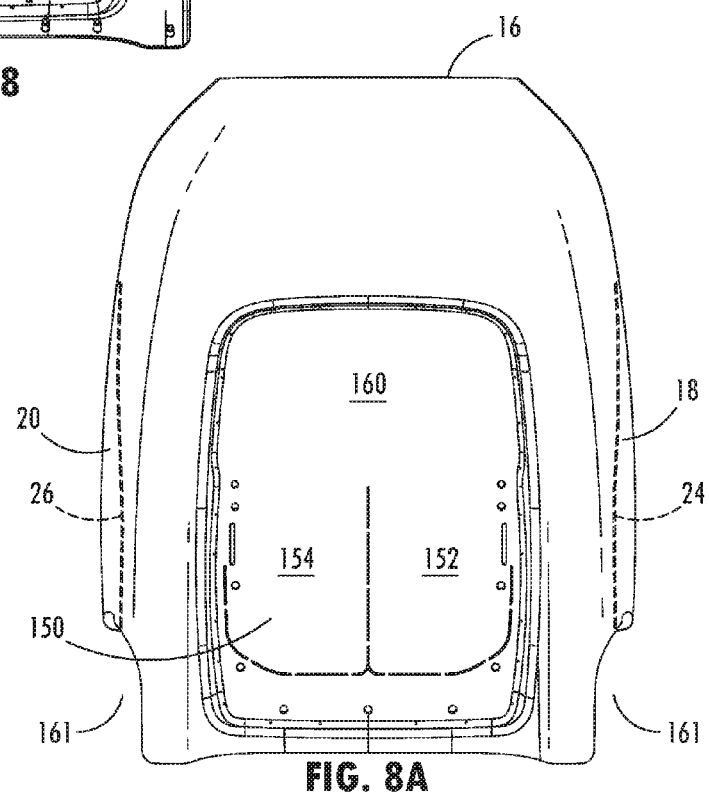
FIG. 8A is a rear elevational view of the back panel of FIG. 8.

Referring now to FIGS. 8 and 8A, the back panel 16 is designed to complement the shape of the front closeout panel 36, as well as a back side of the seat frame 28. A lower portion of the back panel 16 includes a W-shaped controlled deformation area 150 configured to allow for movement of the buttocks and lower back region of an occupant to move rearwardly, which may result in outward movement of first and second panels 152, 154 of the W-shaped controlled deformation area 150 during a rear collision. Conversely, the W-shaped controlled deformation area 150 also allows for movement of the first and second panels 152, 154 into the seatback 56 as forced by the knees of an occupant behind the vehicle seatback assembly 10 during a front collision event. A plurality of fastening posts 156, which may be heat stake posts, are disposed below the retention clips 124, and are configured to engage a bottom portion of the seatback 56. Notably, a panel, or pocket, may be provided over an indentation 160 positioned on a rear portion of the back panel 16, which provides for a storage option inside the vehicle 50. It is contemplated that the panel or pocket may be generally rigid, or flexible. The back panel 16 also includes lower scalloped portions 161 configured to accommodate the recliner heart 104 and possibly a portion of the seat base 52.

Figure 9:
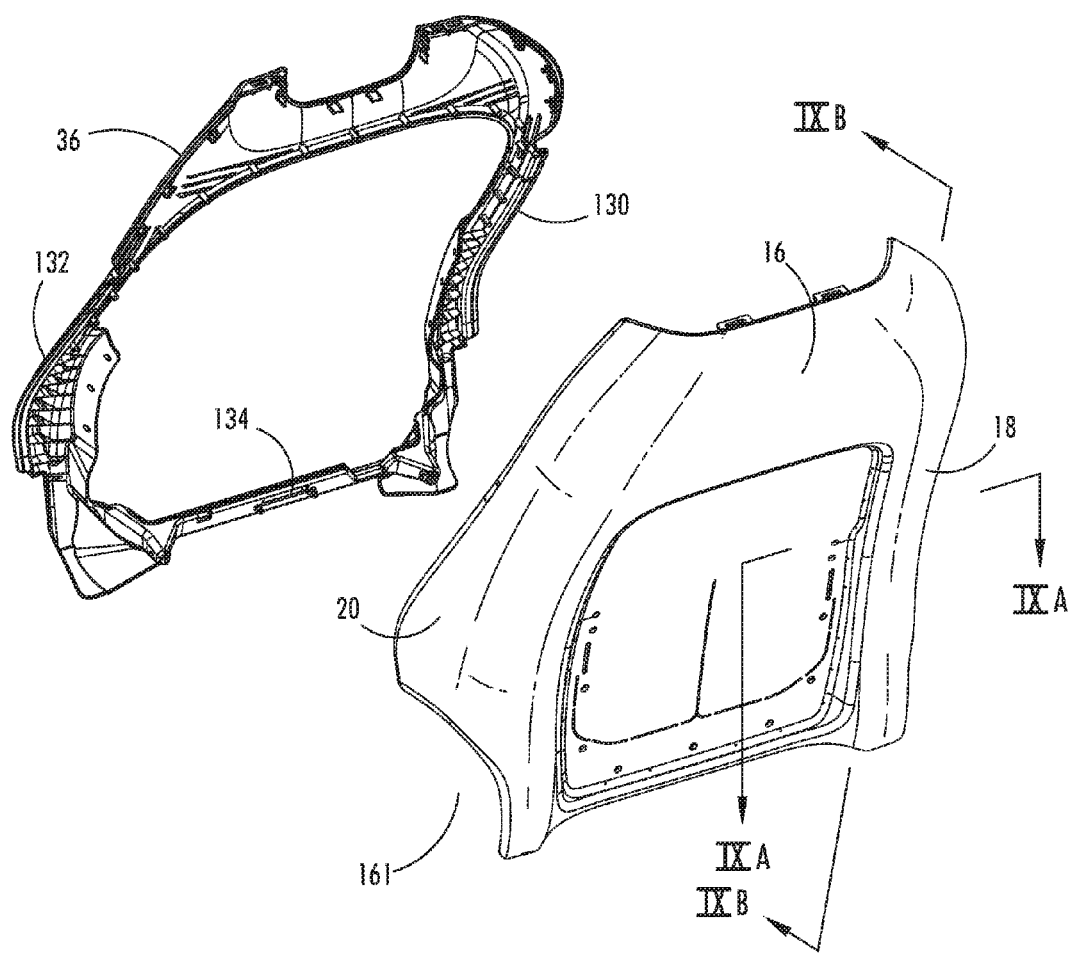
FIG. 9 is a rear perspective exploded view of the closeout panel and back panel of the vehicle seatback assembly.

With reference now to FIG. 9, as previously noted, the closeout panel 36 and the back panel 16 generally include a periphery that is complementary. As a result, the shingled portion 40 of the front closeout panel 36 can easily extend behind and couple with the back panel 16, providing a visually seamless transition from the closeout panel 36 to the back panel 16, as disclose din further detail herein. A lower portion of both the closeout panel 36 and the back panel 16 include recesses configured to receive a lower portion of the seatback 56 and a portion of the seat base 52.

Figure 9A:
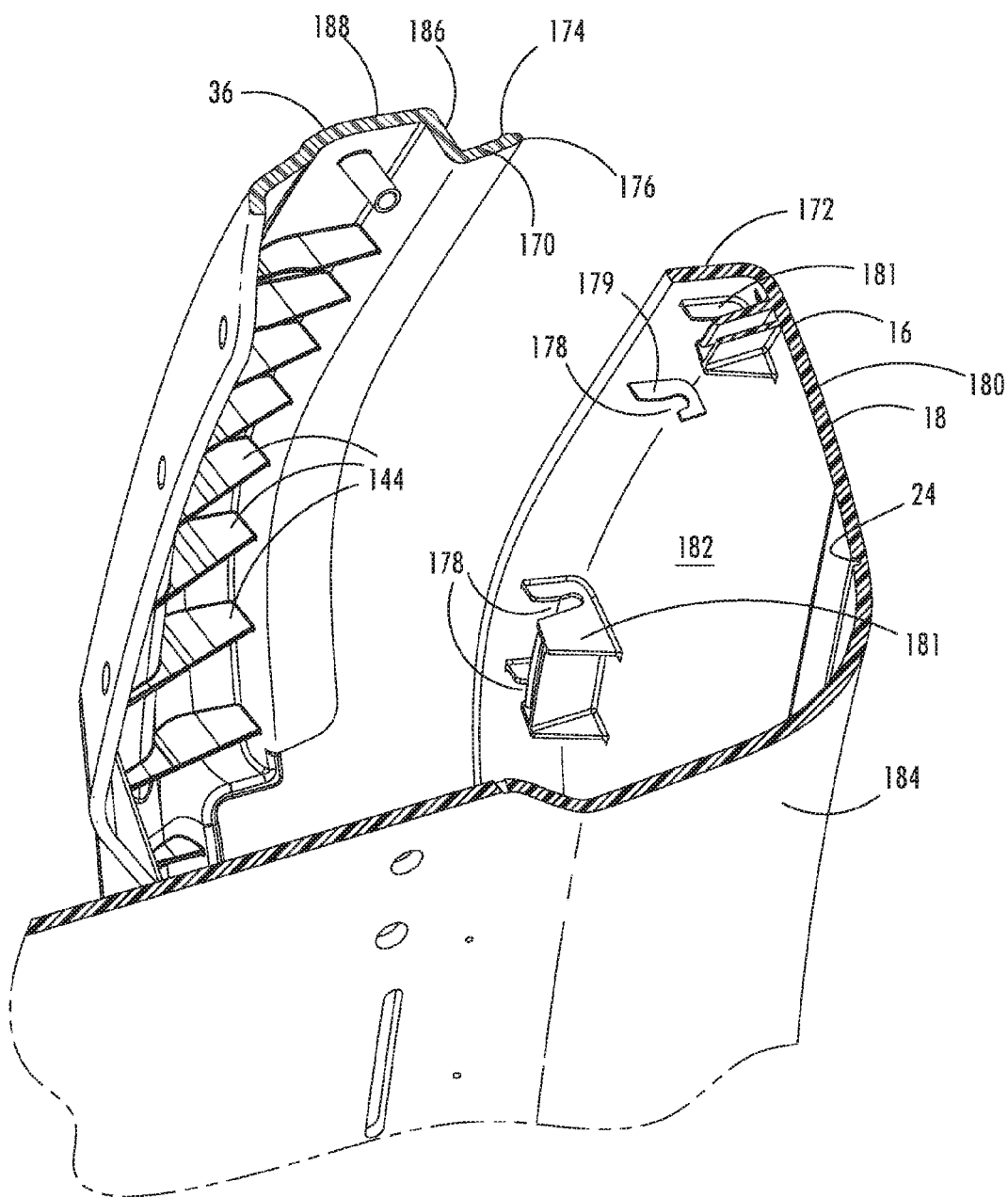
FIG. 9A is a partial top perspective exploded view of the closeout panel and back panel taken at line IXA-IXA of FIG. 9.
Figure 9B:
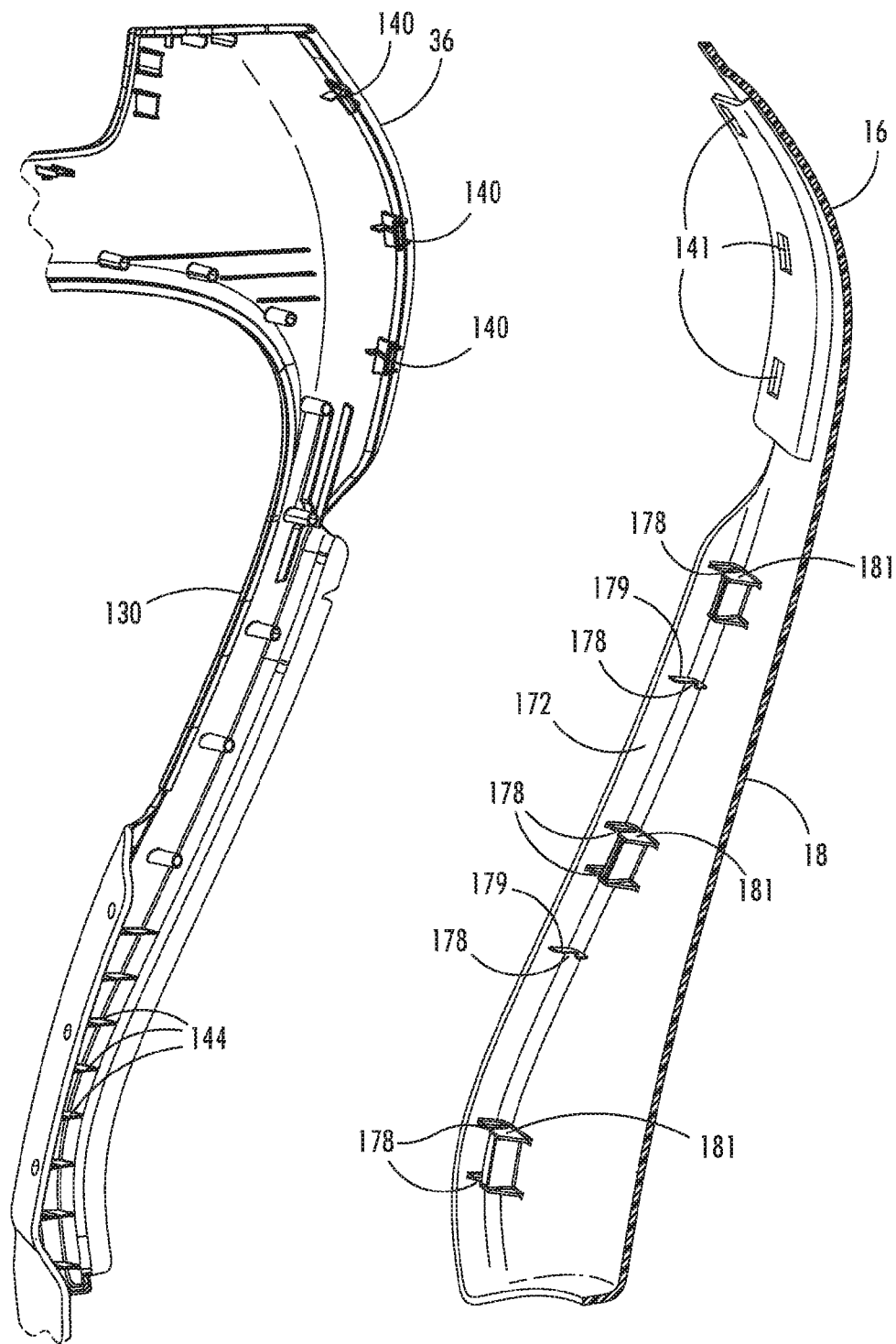
FIG. 9B is a partial side cross-sectional elevational exploded view of the closeout panel and back panel of FIG. 9 taken at line IXB.

With reference now to FIGS. 9A and 9B, portions of the front closeout panel 36 and the back panel 16 are illustrated prior to assembly. As illustrated, the front closeout panel 36 includes an elongate engagement flange 170 configured to engage a complementary receiving flange 172 on the back panel 16. The elongate engagement flange 170 includes a nub 174 on a distal end 176 thereof that provides a friction-fit configured to engage receiving slots 178 behind the receiving flange 172 of the back panel 16. The receiving slots 178 are formed in distinct hooks 179, as well as in decoupling fasteners 181. The nubs 174 may be in the form of a plurality of nubs extending vertically along the length of the elongate engagement flange 170, or may be one elongate nub 174 that extends along the elongate engagement flange 170. The elongate engagement flange 170 forms a part of the first side portion 18. The first side portion 18 also includes a sidewall 180 that extends generally orthogonal to the receiving flange 172. As illustrated in FIG. 9A, the first living hinge 24 is illustrated as being at an inside portion 182 of the back panel 16. However, it will be noted that the first living hinge 24 could be defined by a channel disposed on an outside portion 184 of the back panel 16, or by a hollowed channel disposed between the outside portion 184 and the inside portion 182 of the back panel 16. The receiving slots 178 that are generally defined between the receiving flange 172 and the sidewall 180 of the first side portion 18 of the back panel 16 are illustrated as being intermittent along a vertical extent of the first side portion 18. However, it will be understood that alternate embodiments that include multiple receiving slots 178, one receiving slot 178, or an elongate slot defining a receiving slot 178 may also be defined behind the receiving flange 172 of the first side portion 18.

With reference again to FIGS. 9A and 9B, the front closeout panel 36 includes the elongate engagement flange 172, as well as an offset portion 186 and a front wall 188. The connecting features 142 are disposed on an inboard side of the closeout panel 36. The reinforcement members 144 that extend laterally across the closeout panel 36 extend between the elongate engagement flange 170, the front wall 188, and the offset portion 186 of the closeout panel 36. Although a plurality of reinforcement members 144 are illustrated, it will be understood that more or less reinforcement members 144 may be applied, or that the front closeout panel 36 may be thicker or include a more rigid structure, such that reinforcement members 144 are unnecessary.

Figure 10:
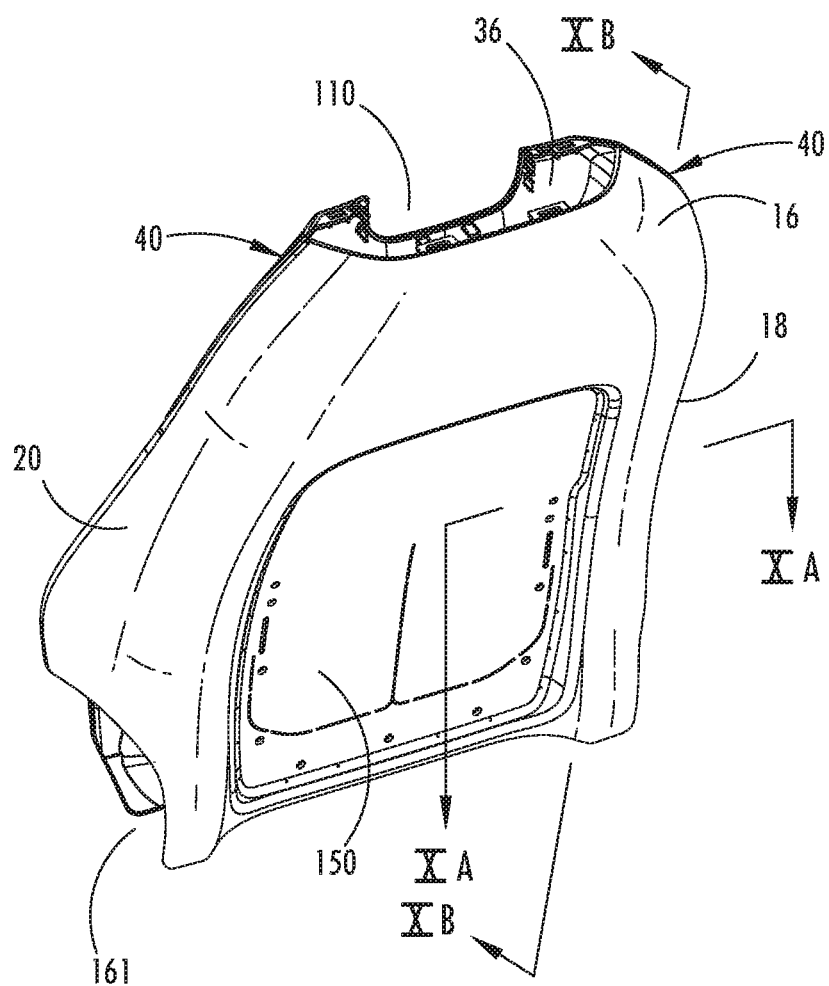
FIG. 10 is a top perspective view of the front closeout panel and back panel engaged with one another.
Figure 10A:
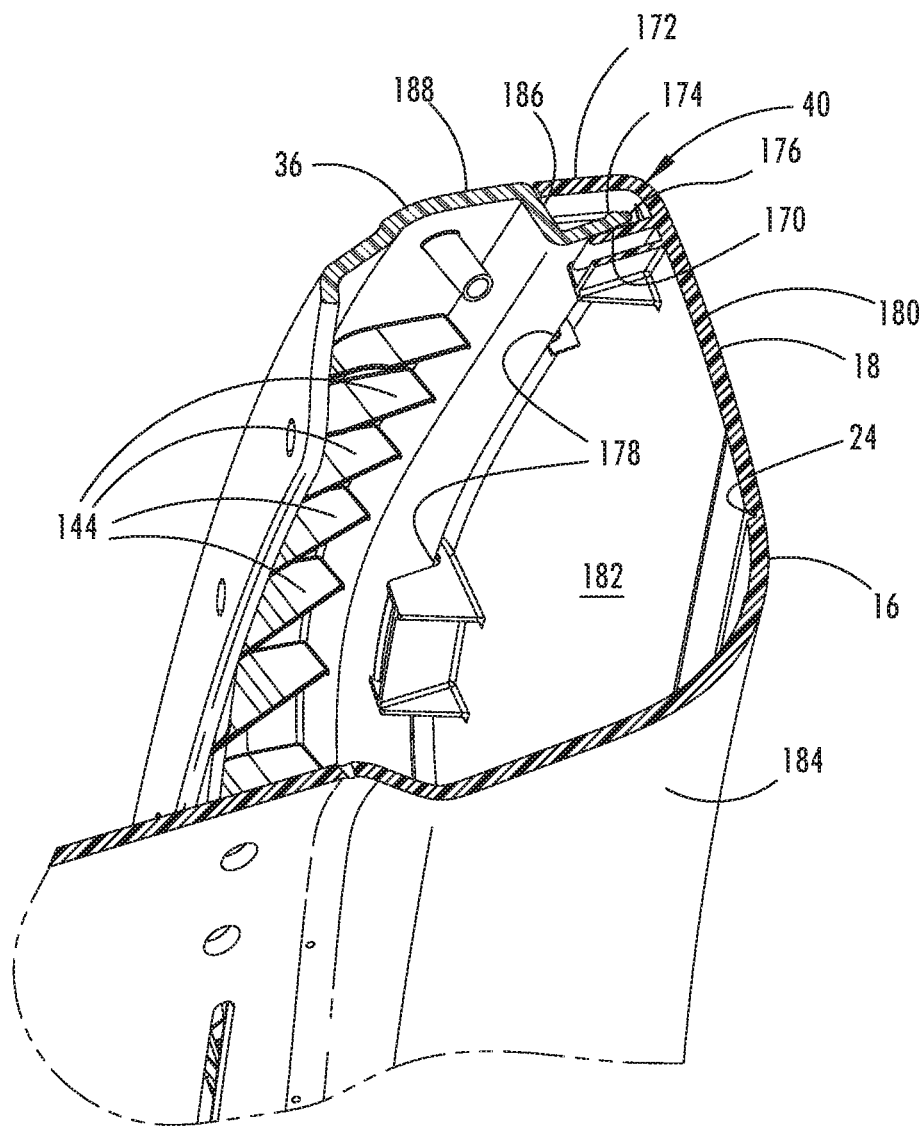
FIG. 10A is a partial top perspective view of the closeout panel and back panel of FIG. 10 taken at line XA.
Figure 10B:
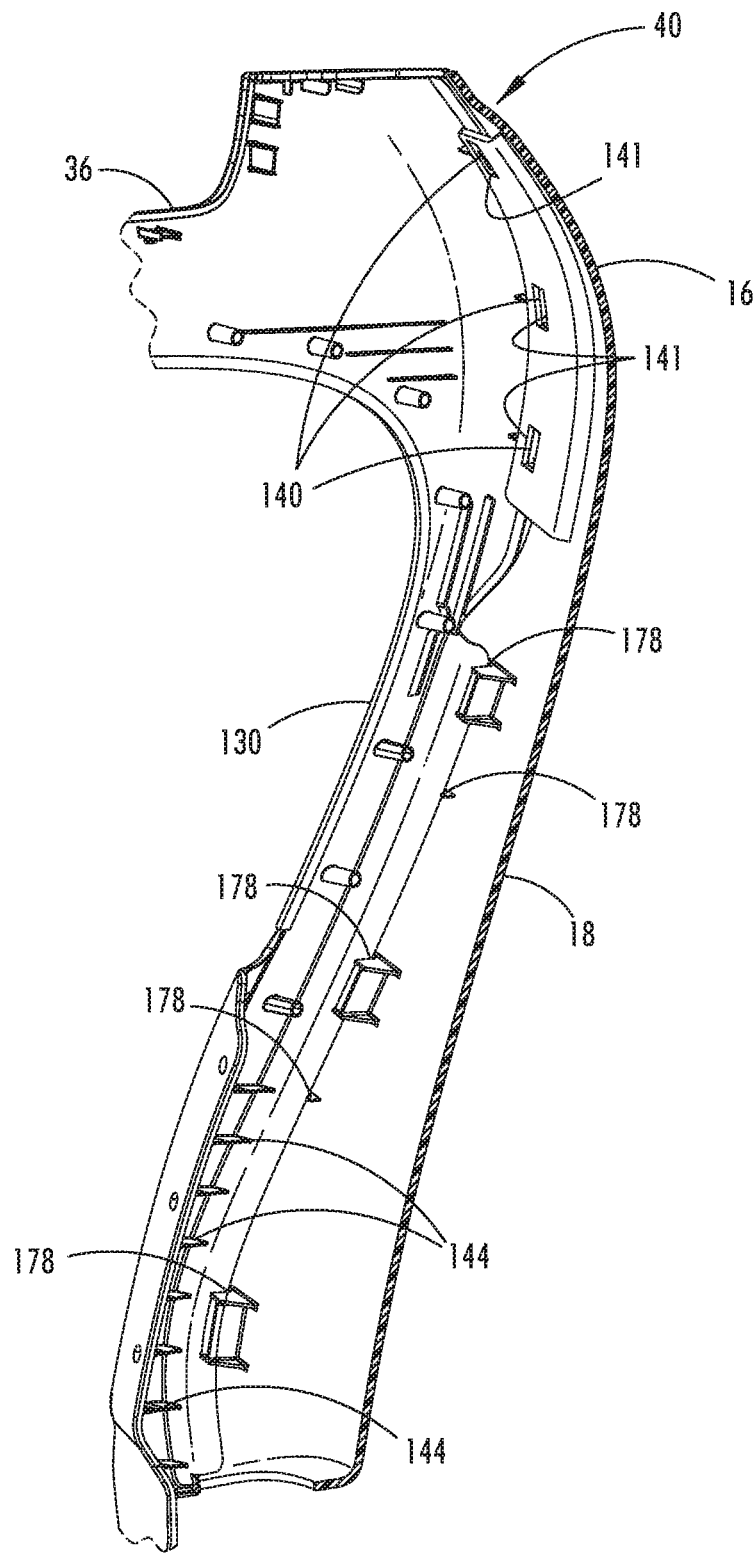
FIG. 10B is a partial side cross-sectional elevational view of the closeout panel and back panel of FIG. 10 taken at line XB.

With reference now to FIGS. 10-10B, in the illustrated embodiment, the closeout panel 36 is shown after assembly with the back panel 16. As illustrated, the elongate engagement flange 170 of the front closeout panel 36 is inserted behind the receiving flange 172 of the first side portion 18. The nubs 174 extending forward from the elongate engagement flange 170 of the front closeout panel 36 are in secure frictional engagement with the receiving slots 178 disposed behind the receiving flange 172 of the first side portion 18 of the back panel 16. In this position, the elongate engagement flange 170 and the receiving flange 172 generally define an aesthetically seamless transition from the back panel 16 to the front closeout panel 36 at the shingled portion 40 and at an upper section of the closeout panel 36, which directly engages the back panel 16, but is free of a shingled portion. In this arrangement, a sturdy and robust structure is provided, which is adapted for everyday use by an occupant. In the event of a collision, the airbag 42 can easily be deployed against the first side portion 18 and the front closeout panel 36 to result in the airbag 42 being deployed outside of the vehicle seatback assembly 10.

With reference again to FIGS. 9-10B, it will be understood that the features shown and described in relation to the first side portion 18 of the back panel 16 also apply to the second side portion 20 and the second living hinge 26. For purposes of minimizing duplication, an identical discussion in relation to the function and features of the second side portion 20 and the second living hinge 26 is not provided. However, it will be understood that all of the features that have been disclosed in relation to the first side portion 18 and the first living hinge 24 of the back panel 16 also apply to the second side portion 20 and the second living hinge 26 of the back panel 16.

Figure 11:
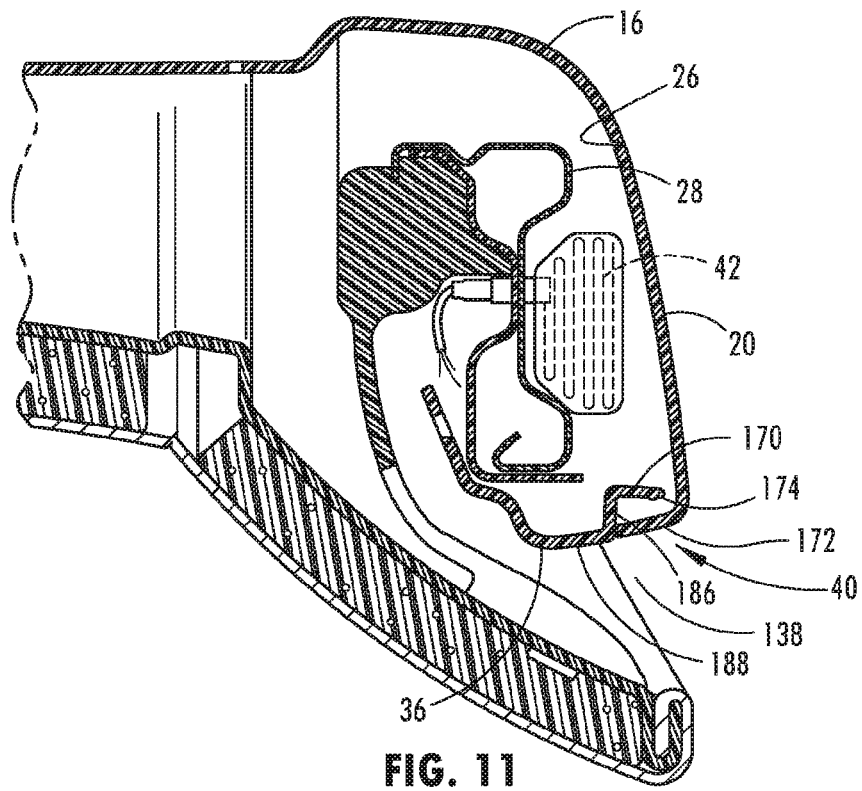
FIG. 11 is a top plan cross-sectional view of a portion of the closeout panel and back panel prior to a collision event.
Figure 11A:
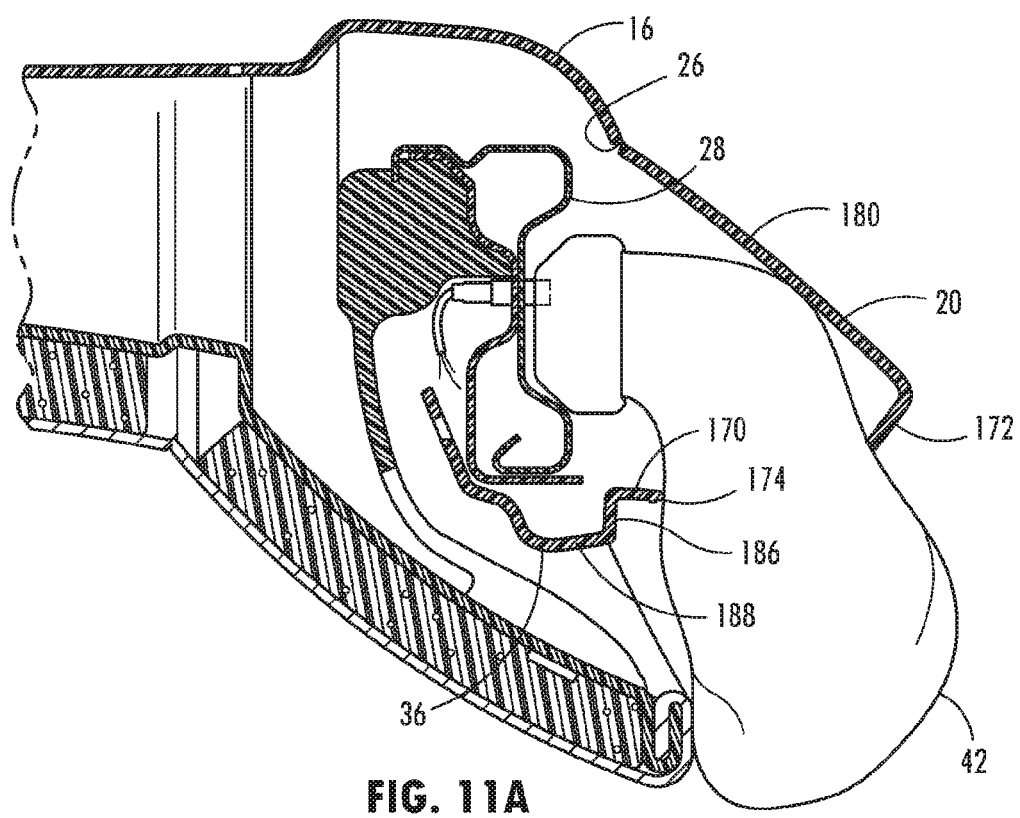
FIG. 11A is a top plan cross-sectional view a portion of the closeout panel and back panel of the present disclosure after deployment of the airbag.

With reference now to FIGS. 11 and 11A, deployment of the airbag 42 between the front closeout panel 36 and the second side portion 20 is illustrated. FIG. 11 illustrates the airbag 42 prior to deployment, and with the front closeout panel 36 tucked behind the back panel 16, and more specifically, the offset portion 186 and the elongate engagement flange 170 of the front closeout panel 36 tucked behind the receiving flange 172 of the second side portion 20 of the back panel 16. This structure illustrates normal everyday use of the vehicle seatback assembly 10. As illustrated in FIG. 11A, the airbag 42 is shown as deployed, wherein the receiving flange 172 disengages the elongate engagement flange 170 of the front closeout panel 36 and the airbag 42 deploys therebetween. Notably, the front closeout panel 36, and specifically, the offset portion 186 and the elongate engagement flange 170 of the closeout panel 36 do not change position, or barely change position. However, the second side portion 20 changes position substantially as the second side portion 20 rotates about the second living hinge 26 of the back panel 16.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seatback assembly comprising:
    a cushion assembly having a seating surface;
    a back panel having a first side portion, a second side portion, and a back portion, wherein a first living hinge is disposed between the first side portion and the back portion and a second living hinge is disposed between the second side portion and the back portion;
    a frame disposed between the back panel and the cushion assembly;
    a peripheral cushion structure supporting a periphery of the cushion assembly;
    a closeout panel coupled with the back panel and disposed behind the peripheral cushion structure to define a peripheral gap between the closeout panel and the peripheral cushion structure that extends around sides of said seatback assembly;
    a shingled portion of the closeout panel extending behind and coupling with the back panel; and
    an airbag coupled with the frame and configured to deploy between the closeout panel and the back panel, wherein the second side portion and the second living hinge define a triangular section configured to flex away from the closeout panel when the airbag is deployed.

2. The vehicle seatback assembly of claim 1, wherein the closeout panel defines an intermediate cavity.

3. The vehicle seatback assembly of claim 1, wherein the closeout panel includes an upper recess configured to receive a head restraint.

4. The vehicle seatback assembly of claim 1, wherein the closeout panel includes inner laterally-extending flanges configured to provide support proximate the shingled portion.

5. The vehicle seatback assembly of claim 1, wherein an upper section of the closeout panel directly engages the back panel and is free of a shingled portion.

6. A vehicle seatback assembly comprising:
   a seatback frame disposed between a back panel and a cushion assembly;
   a peripheral cushion structure supporting a periphery of the cushion assembly;
   a closeout panel coupled with the back panel and disposed behind the peripheral cushion structure to define a peripheral gap;
   a shingled portion of the closeout panel concealed behind and coupled with the back panel; and
   an airbag deployed between the closeout panel and the back panel, wherein the second side portion and the second living hinge define a triangular section configured to flex away from the back panel when the airbag is deployed.

7. The vehicle seatback assembly of claim 6, wherein the back panel includes a first side portion, a second side portion, and a back portion, wherein a first living hinge is disposed between the first side portion and the back portion, and a second living hinge is disposed between the second side portion and the back portion.

8. The vehicle seatback assembly of claim 6, further comprising:
   a plurality of decoupling fasteners disposed on the back panel and configured to engage the shingled portion.

9. The vehicle seatback assembly of claim 6, wherein the closeout panel defines an intermediate cavity.

10. The vehicle seatback assembly of claim 6, wherein the closeout panel includes an upper recess configured to receive a head restraint.

11. The vehicle seatback assembly of claim 6, wherein the closeout panel includes inner laterally-extending flanges configured to provide support proximate the shingled portion.

12. The vehicle seatback assembly of claim 6, wherein an upper section of the closeout panel directly engages the back panel and is free of a shingled portion.

13. A vehicle seatback assembly comprising:
   a seatback frame disposed between a back panel and a cushion assembly;
   a peripheral cushion structure supporting a periphery of the cushion assembly;
   a closeout panel coupled with the back panel and disposed behind the peripheral cushion structure to define a peripheral gap;
   a shingled portion of the closeout panel defined by an engagement flange concealed behind and coupled with a complementary receiving flange of the back panel, wherein the closeout panel includes inner laterally-extending flanges that connect a front wall of the closeout panel with an offset portion of the closeout panel, the inner laterally-extending flanges being configured to provide support proximate the shingled portion; and
   an airbag deployed between the closeout panel and the back panel.

14. The vehicle seatback assembly of claim 13, a plurality of decoupling fasteners disposed on the back panel and configured to engage the shingled portion.

15. The vehicle seatback assembly of claim 13, wherein the closeout panel defines an intermediate cavity.

16. The vehicle seatback assembly of claim 13, wherein the closeout panel includes an upper recess configured to receive a head restraint.

* * * * *